(12) United States Patent
Kumar

(10) Patent No.: US 11,379,690 B2
(45) Date of Patent: Jul. 5, 2022

(54) SYSTEM TO EXTRACT INFORMATION FROM DOCUMENTS

(71) Applicant: Infrrd Inc, San Jose, CA (US)

(72) Inventor: Vikas Kumar, Bengaluru (IN)

(73) Assignee: Infrrd Inc., San Jose, CA (US)

( * ) Notice: Subject to any disclaimer, the term of this patent is extended or adjusted under 35 U.S.C. 154(b) by 375 days.

(21) Appl. No.: 16/794,266

(22) Filed: Feb. 19, 2020

(65) Prior Publication Data

US 2020/0184267 A1 Jun. 11, 2020

(51) Int. Cl.

| | | |
|---|---|---|
| *G06K 9/00* | (2022.01) | |
| *G06K 9/62* | (2022.01) | |
| *G06N 20/00* | (2019.01) | |
| *G06N 5/04* | (2006.01) | |
| *G06F 40/30* | (2020.01) | |
| *G06F 40/284* | (2020.01) | |
| *G06F 40/117* | (2020.01) | |
| *G06V 10/56* | (2022.01) | |
| *G06V 30/10* | (2022.01) | |

(52) U.S. Cl.
CPC .......... *G06K 9/6256* (2013.01); *G06F 40/117* (2020.01); *G06F 40/284* (2020.01); *G06F 40/30* (2020.01); *G06N 5/04* (2013.01); *G06N 20/00* (2019.01); *G06V 10/56* (2022.01); *G06V 30/10* (2022.01)

(58) Field of Classification Search
CPC .................................................... G06F 40/117
See application file for complete search history.

(56) References Cited

U.S. PATENT DOCUMENTS

| | | | |
|---|---|---|---|
| 2004/0223197 A1* | 11/2004 | Ohta .................... | H04N 1/4177 707/E17.027 |
| 2015/0169951 A1* | 6/2015 | Khintsitskiy ........ | G06V 30/418 382/182 |
| 2015/0379341 A1* | 12/2015 | Agrawal .............. | G06V 30/414 382/176 |
| 2018/0300315 A1* | 10/2018 | Leal ...................... | G06F 16/355 |
| 2020/0184267 A1* | 6/2020 | Kumar ................. | G06N 3/0454 |

* cited by examiner

*Primary Examiner* — Hadi Akhavannik

(57) ABSTRACT

A method of training a system to extract information from documents comprises feeding digital form of training documents to an OCR module, which identifies multiple logical blocks in the documents and text present in the logical blocks. One or more tags for the whole of the document, the logical blocks and word tokens on the document are received by a tagging module. A text input comprising the text identified in the document and the tags for the whole of the document are received by a machine learning module. A first image of the document with layout of the one or more of the identified blocks superimposed, and the tags of the logical blocks in the document are received by the machine learning module, wherein the received text input, first image and tags for the logical blocks corresponds to a plurality of the training documents.

9 Claims, 9 Drawing Sheets

400

INVOICE

LOGO

Saffron Design
77 Namrata Bldg
Delhi, Delhi 400077

402

| BILL TO |
|---|
| Panchika Randhawa |
| 27, Dlf City, Central |
| Delhi, Delhi 40003 |

404

| SHIP TO |
|---|
| Kavindra Mannan |
| 284, Abdul Rehman |
| Mumbai, Bihar 40009 |

406

| INVOICE # | IN-001 |
|---|---|
| INVOICE DATE | 29/01/2019 |
| P.O. # | 2430/2019 |
| DUE DATE | 28/04/2019 |

410

| QTY | DESCRIPTION | UNIT PRICE | AMOUNT |
|---|---|---|---|
| 1 | Frontend design restructure | 9,999.00 | 9,999.00 |
| 2 | Custom icon package | 975.00 | 1,950.00 |
| 3 | Gandhi mouse pad | 99.00 | 297.00 |
|  | | Subtotal | 12,246.00 |
|  | | VAT 6.0% | 734.76 |
|  | | TOTAL | ₹12,980.76 |

SYSTEM TO EXTRACT INFORMATION FROM DOCUMENTS

BACKGROUND

Unless otherwise indicated herein, the materials described in this section are not prior art to the claims in this application and are not admitted to being prior art by inclusion in this section.

Field of the Invention

The subject matter in general relates to information extraction from documents. More particularly, but not exclusively, the subject matter relates to system and method for extracting textual and graphical information from the documents using machine learning modules.

Discussion of the Related Art

Most businesses receive documents such as invoices, receipt records, payroll reports, paid bills, bank statements, income statements and tax reporting forms, among others. The documents may be generated in various electronic file formats. These documents are crucial for many businesses' operation. Typically, information needs to be extracted from such documents for various purposes. Extracting such information involves considerable manual efforts.

With the advent of Optical Character Recognition (OCR) techniques, time can be saved by automatically extracting the text out of a digital image of any document. Keeping track of business expenses by using OCR is a widespread practice. The OCR results of each document needs to be parsed appropriately to find relevant information and discard irrelevant information. The information is entered into a software which provides a reviewer with a template to make his/her task easier. However, in the instant approach there are challenges due to unstructured results of OCR. The data entered still has to be put through manual review to correct errors.

In one of the conventional approaches, information retrieval is based on keywords, treating text as sequence and predicting the next word in the sequence. The instant approach is merely based on natural language processing. However, mere use of the instant approach also has challenges in precise extraction of information, since precise extraction of data from the documents is a tedious task, due to high variance in fonts and layouts, unstructured scanning environments and presence of various domains, complex structure and semantics in documents.

In view of the forgoing discussion, there is a need for improved technical solution for information extraction from the documents.

SUMMARY

In an embodiment, a method of training a system to extract information from documents. A digital form of training documents is fed to a layout preserving Optical Character Recognition (OCR) module. A plurality of logical blocks and text present in the blocks are identified within each of the documents by the OCR module. One or more tags corresponding to the whole of the document is/are received by the tagging module. One or more tags for one or more of the logical blocks is/are received by the tagging module. One or more tags word tokens for one or more word tokens on the document is/are received by the tagging module. A text input comprising the text identified in the document and the tags for the whole of the document are received by a machine learning module. Further, a first image of the document with layout of the one or more of the identified blocks superimposed and the tags for the logical blocks in the document are received by the machine learning module. The text input, the first image and the tags for the logical blocks are received from a plurality of training documents.

BRIEF DESCRIPTION OF DIAGRAMS

This disclosure is illustrated by way of example and not limitation in the accompanying figures. Elements illustrated in the figures are not necessarily drawn to scale, in which like references indicate similar elements and in which:

FIG. 4A illustrates logical blocks in the document 102, in accordance with an embodiment;

FIG. 4B illustrates colour coded logical blocks in the document 102, in accordance with an embodiment;

DETAILED DESCRIPTION OF THE INVENTION

The following detailed description includes references to the accompanying drawings, which form part of the detailed description. The drawings show illustrations in accordance with example embodiments. These example embodiments are described in enough detail to enable those skilled in the art to practice the present subject matter. However, it may be apparent to one with ordinary skill in the art that the present invention may be practised without these specific details. In other instances, well-known methods, procedures and components have not been described in detail so as not to unnecessarily obscure aspects of the embodiments. The embodiments can be combined, other embodiments can be utilized, or structural and logical changes can be made without departing from the scope of the invention. The following detailed description is, therefore, not to be taken in a limiting sense.

In this document, the terms "a" or "an" are used, as is common in patent documents, to include one or more than one. In this document, the term "or" is used to refer to a non-exclusive "or", such that "A or B" includes "A but not B", "B but not A", and "A and B", unless otherwise indicated.

It should be understood that the capabilities of the invention described in the present disclosure and elements shown in the figures may be implemented in various forms of hardware, firmware, software, recordable medium or combinations thereof.

The current disclosure provides a technical solution for extracting information from documents using machine learning modules. More particularly, the disclosure deals with training of the machine learning modules to make entity extraction and classification more precise, thereby enabling relatively more precise extraction of information from documents.

Figure 1A:
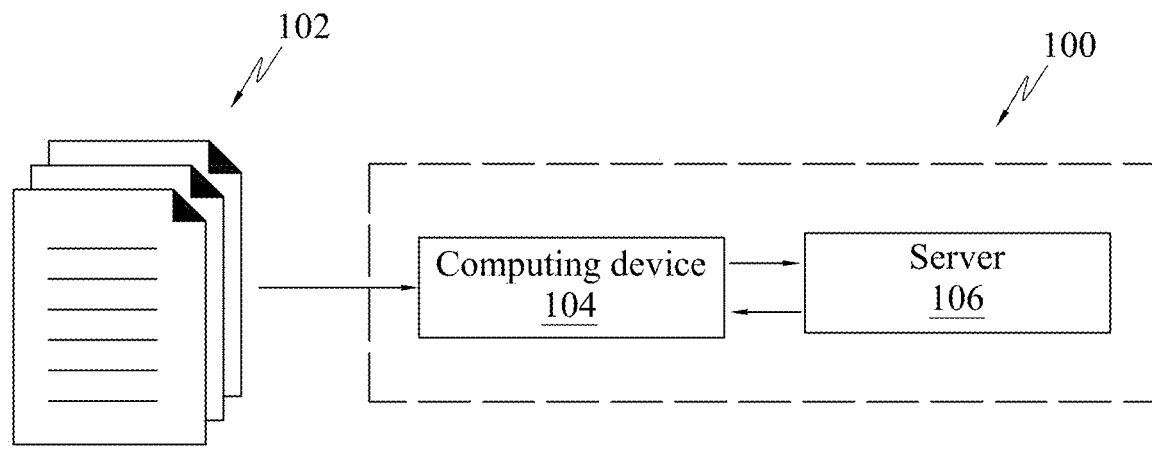
FIG. 1A illustrates a system 100, in accordance with an embodiment.

Referring to the figures, and more particularly to FIG. 1A, a system 100 for extracting information from document(s), using textual and graphical features in the document is provided, in accordance with an embodiment. The system 100 may comprise a computing device 104 and a server 106.

In an embodiment, the documents 102 may include invoices, receipt, records, payroll reports, paid bills, bank statements, passports, income statements and tax reporting forms, among others.

In an embodiment, the computing device 104 may include smart phone, PDA, tablet PC, notebook PC, desktop, kiosk or laptop, among like computing devices.

In an embodiment, the server 106 may be implemented in the form of one or more processors with a memory module coupled to one or more processors with one or more communication modules. The server 106 may communicate with one or more external sources and one or more computing devices 104 through communication modules.

Figure 1B:
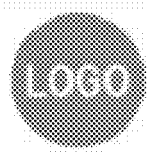
FIG. 1B illustrates a sample document 102, in accordance with an embodiment.

Referring to FIG. 1B, a sample document 102, such as invoice document is illustrated, in accordance with an embodiment.

Figure 2:
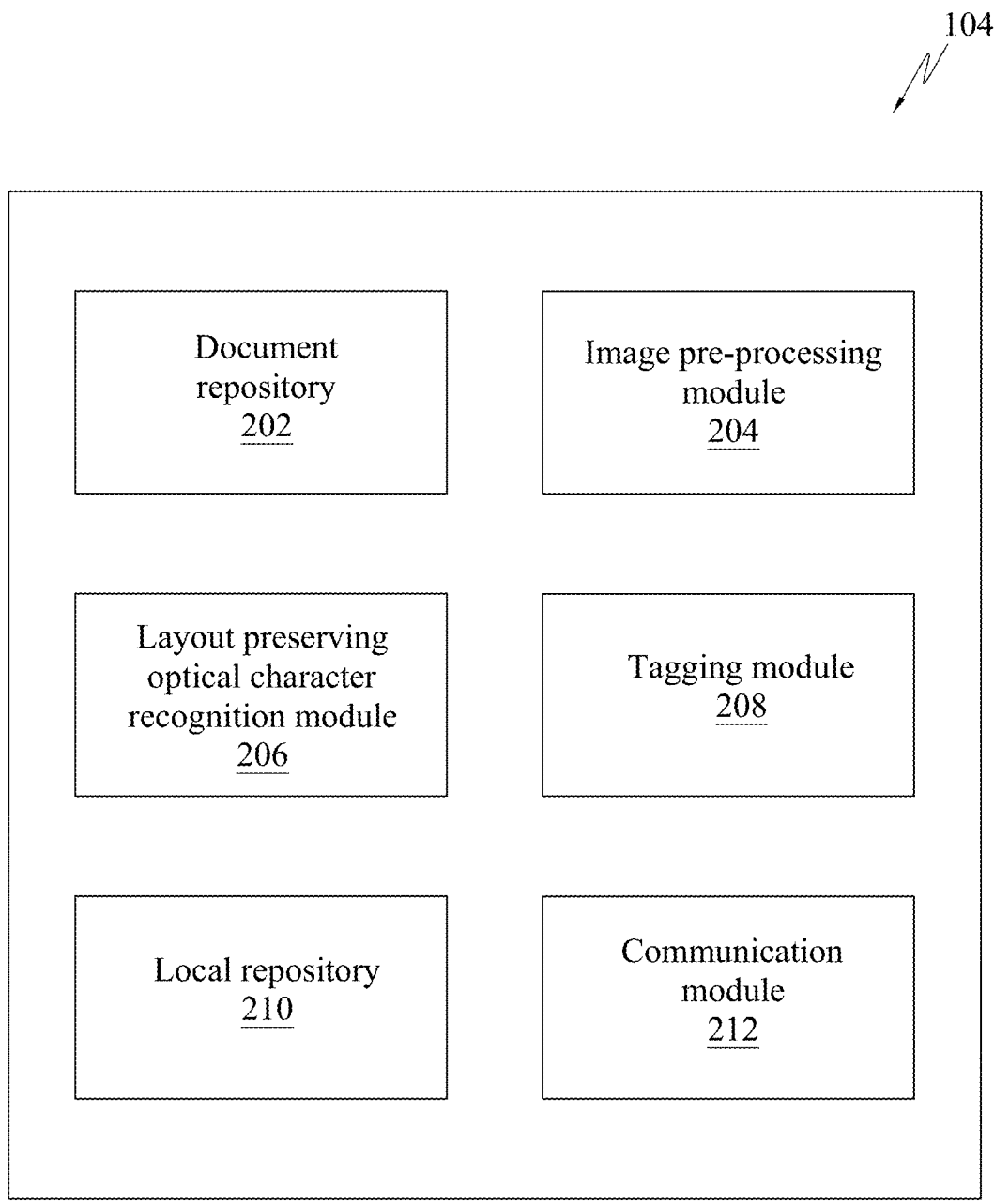
FIG. 2 illustrates various modules of a computing and communicating device 104, in accordance with an embodiment.

Referring to FIG. 2, various modules of the computing device 104 are disclosed, in accordance with an embodiment.

In an embodiment, the computing device 104 may comprise a document repository 202, an image pre-processing module 204, layout preserving optical character recognition module 206 ("OCR module 206"), a tagging module 208, a local repository 210 and a communication module 212.

In an embodiment, the document repository 202 may comprise digital copies of several documents 102 that may be used for training the system.

In an embodiment, the digital image of the document 102 may be received by the image pre-processing module 204 for pre-processing the documents 102, before it is communicated to the OCR module 206.

In an embodiment, the image pre-processing module 204 may comprise image processing, noise correction, real time image analysis algorithms, to determine quality of the digital image with respect to brightness, skew, blur, and background colour, among others. The quality of the digital image may vary depending on camera resolution, focus, lightning or tilt of image capturing device, among others. The image pre-processing module 204 may be configured to enhance the quality of the digital image through operations including, but not limited to, noise removal, skew removal, thinning and morphological operations. In addition, the pre-processing module 204 may be configured with thresholding operations to convert the digital image into a binary image to make it easier to work with machines.

In an embodiment, the image pre-processing module 204 may be configured to correct geometric distortions in the digital image. The image pre-processing module 204 may be configured with adaptive binarization techniques to separate printed texts in the digital image from their backgrounds.

In an embodiment, the OCR module 206 recognises characters or words present in the digital image. Further, the layout preserving OCR engine may extract features of the image, including geometrical or statistical features and classify the image into a particular class using artificial intelligence techniques and machine learning, Bayesian networks and classifiers, among others. A learning OCR algorithm such as Convoluted Neural Networks (CNN) or any other appropriate machine-learning algorithm may be used in the computing device 104.

In an embodiment, the OCR module 206 may be trained to detect/analyse layouts and formatting in modern complex documents. The complex documents may include different elements like tables, pictures, footers and headers and, background images, among others. In order to recognize such complex documents and preserve their complex formatting, the OCR module 206 may be trained to analyse the structure of the document. The OCR module 206 may be trained to detect elementary objects on the digital image, such as words, separators, connected components, color gradients and inverted text areas among others.

In an embodiment, once the reading/analysis is completed, the OCR module 206 may initiate data extraction. The OCR module 206 may be trained to extract information corresponding to logical blocks, lines, words, raw text, tables, objects and meta data, among others. The meta data information may correspond to coordinates, fonts and colour maps among others in the documents.

In an embodiment, the tagging module 208. The tagging module 208 may comprise an user interface, that may be configured to enable human annotators to tag or annotate the documents 102. The documents 102 may be reviewed by the annotators to rightly tag the document of interest, entity of interest, and regions of interest, among others.

In an embodiment, the tagging module 208 may be configured to enable users to tag the documents 102 in three modes. The modes may include document level, block level, and word tokens level tagging, among others.

In an embodiment, document level tagging mode may enable tagging the entities corresponding to the documents 102.

In an embodiment, block level tagging mode may enable tagging entities corresponding to the logical blocks in each of the documents.

In an embodiment, word tokens level tagging may enable tagging entities corresponding to the word tokens in the documents 102.

In an embodiment, the local repository 210 may store data extracted from the OCR module 206 and the tags provided in the tagging module 208.

Figure 3:
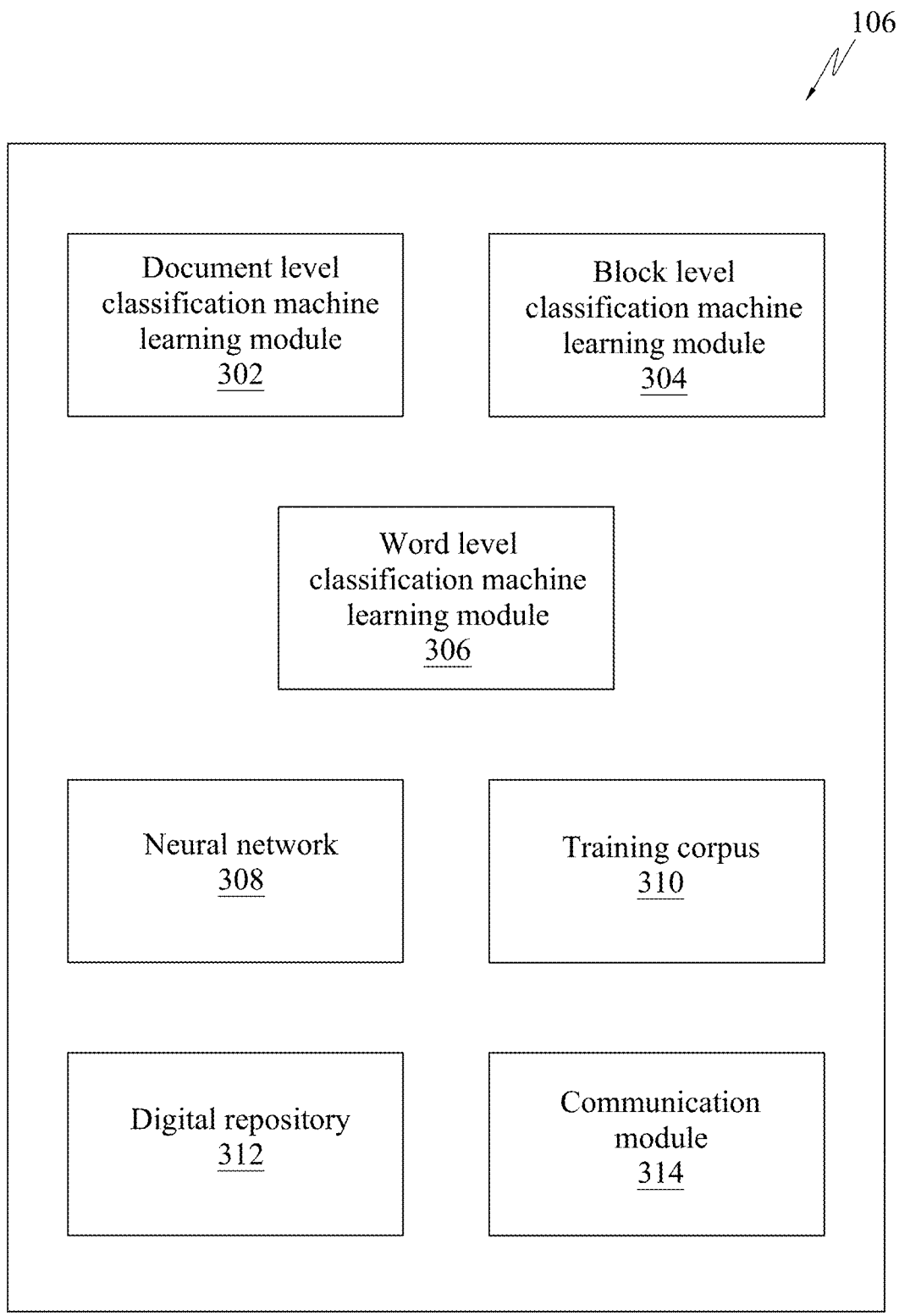
FIG. 3 illustrates various modules of a server 106, in accordance with an embodiment.

Refer to FIG. 3, various modules of the server 106 are disclosed, in accordance with an embodiment.

In an embodiment, the server 106 may comprise a document level classification machine learning module 302, a block level classification machine learning module 304 and word level classification machine learning module 306, a fully connected neural network 308 (or "neural network"), a training corpus 310, a digital repository 312 and a communication module 314.

In an embodiment, the document level classification machine learning module 302 may be trained with specific inputs, in order to make the document level classification module 302 learn to classify the documents.

Likewise, the block level classification machine learning module 304 may be trained with specific inputs, in order to make the block level classification module 304 learn to classify the blocks within documents.

Likewise, the word level classification machine learning module 306 may be trained with specific inputs, in order to make the word level classification module 306 learn to classify word tokens in the documents.

In an embodiment, the fully connected neural network 308 may include decision tree based classifiers such as Random Forest, XGboost and Support Vector Machine, Graphical model, and Attention mechanism based models, among others. The document level classification ML module 302, the block level classification ML module 304 and word level classification ML module 306 may be fed to the fully connected neural network 308.

In an embodiment, the data extracted from the OCR module 206 and the tagging module 208 may be communicated to the server 106 using the communication module 212. The extracted data from the OCR module 206 and tagged data from the tagging module 208 may be used in construction of the training corpus 310.

In an embodiment, the digital repository 312 may be database that may be populated by receiving information from one or more information sources. The digital repository 312 may store at least an information corresponding to the data extracted from the OCR module 206 and the tagging module 208.

Training

In an embodiment, N number of documents may be collected that may include invoices, receipt records, payroll reports, paid bills, bank statements, passports, income statements and tax reporting forms, among others.

In an embodiment, digital images of each of the N number of documents may be stored in the document repository 202 and may be fed to the image pre-processing module 204. The pre-processed images of the N number of documents may be communicated to the OCR module 206.

In an embodiment, pre-processed images of the N number of documents 102 may be communicated to the OCR module 206 from the image pre-processing module 204.

In an embodiment, the OCR module 206 may be configured to identify "logical blocks" in the documents. Refer to FIG. 4A, illustrating the logical blocks 402, 404, 406 and 408 identified by the OCR module 206. The logical blocks 402, 404, 406 and 408 may correspond to different text zones inside the document 102. The text zones may play different logical roles inside the documents. As an example, headers in the documents may logically differ from footnotes in the documents.

In an embodiment, logical blocks 410, 412 and 414 corresponding to line items in the logical block 408 may also be identified as logical blocks in the documents.

In an embodiment, attributes corresponding to the logical blocks 402, 404, 406 and 408 may be extracted from the OCR module 206. The attributes may correspond to text present in the logical blocks 402, 404, 406 and 408, one or more fonts of the texts present in the logical blocks 402, 404, 406 and 408 and, colour corresponding to the logical blocks 402, 404, 406 and 408, among others.

As an example, let's say the OCR module 206 may have identified one of the logical blocks as "block 1" from one of the documents 102. In an embodiment, attribute information corresponding to "text" present in the "block 1" may be extracted from the OCR module 206. The attribute information corresponding to "fonts" present in the block 1, "coordinates" of the block 1 and, "colour" of the block 1, among others may be extracted by the OCR module 206.

In an embodiment, the OCR module 206 may be configured to extract attributes corresponding to each of the words present in the each of the logical blocks 402, 404, 406 and 408, wherein one word may be considered at a time in attribute extraction.

In an embodiment, the attributes corresponding to the "words" may include font present in the word, coordinates of the word and color corresponding to the word, among others.

As an example, let's say the OCR module 206 may have identified a "word 1" from one of the blocks, "block 1". In an embodiment, attributes information corresponding to "word 1" may be extracted by the OCR module 206. The attribute information corresponding to "font" present in the word 1, "coordinates" of the word 1, and, "colour" of the word 1, among others may be extracted.

In an embodiment, the information corresponding to "raw_ocr_text" (complete text) from each of the N number of documents 102 may be extracted using the OCR module 206.

In an embodiment, the document level tagging mode may enable tagging the documents 102 manually, based on its type. The document type may correspond to relevant or non-relevant. The documents of relevant type may be tagged as invoice, receipt, passport, driving license, bank statement and tax forms, among others.

In an embodiment, the document level tagging mode may enable tagging the documents based on certain categories the documents may belong to. As an example, the categories may include fuel, retail, transport, pharmaceutic and food, among other categories in the documents.

In an embodiment, the document level tagging mode may enable tagging the field locale or field locale identifiers (locale ID). The locale ID may either be a language or a language in combination with a country. As an example, fr-CA may correspond to a language "French" in country "Canada", that is to say, locale name may be "Canadian French".

In an embodiment, the document level tagging mode may enable tagging corresponding to an entity "currency" in the documents. As an example, "Canadian $" may be tagged indicating Canadian dollar, "Singaporean $" may be tagged indicating Singaporean dollar and so on.

In an embodiment, the document level tagging may enable tagging whether or not logo is present in the document.

In an embodiment, the document level tagging mode may enable tagging presence of stamps in the documents.

In an embodiment, the document level tagging mode may enable tagging presence of handwritten texts in the documents.

In an embodiment, the document level tagging mode may enable tagging the documents based on type of documents. The type of the documents may correspond to a machine generated pdf, a scanned pdf or camera generated image, among others.

In an embodiment, block level tagging mode may enable tagging, where the entities corresponding to the logical blocks in each of the documents may be tagged. As an example, certain block may be tagged as header. In some of the blocks, footers may be present, that may be tagged. In certain blocks, line items may also be tagged. In a certain blocks, addresses may be present such as shipping address, billing address, among others. A block may be tagged as "shipping address" in the documents. The logical block, if that corresponds to a body in the logical block, corresponding block may be tagged as "body", and so on. It may be noted that, colour codes corresponding to the tagged block may be mapped with each other. As an example, the block tagged as "header" may be mapped with a colour code let's say, #1234, where the colour codes may be stored against their corresponding tagged entity in a local repository as colour name dictionary. Likewise, each of the entities may be mapped to a certain colour code and stored in the local repository.

In an embodiment, the block level tagging mode may enable correction of words in the block as well.

In an embodiment, the block level tagging mode may enable tagging presence of the handwritten text in the block.

In an embodiment, word tokens tagging mode may enable tagging of various entities present in the documents. The entities of interest may be tagged. The entities to be tagged may be decided as per subject matter experts and users' requirements. As an example, the raw ocr data of the documents obtained from the OCR module 206 may include 100s of words, but only few of those words may be qualified as entities of interest. The entities such as "merchant name", "total amount" and "invoice date", among others may be tagged.

In an embodiment, the training corpus 310 may be constructed, that may comprise data extracted from the OCR module 206 and the tagged data obtained from the tagging module 208. The training corpus 310 may be fed to the machine learning modules for training.

In an embodiment, a first input may be extracted for the training corpus 310. The first input may comprise attributes corresponding to each of the identified blocks in each of the documents. As an example, let's say $X_1$ is the first input that may represent a "block 1" in one of the documents. The input "$X_1$" may be represented as provided below:

```
X₁:
{
"Name" : "block 1";
"Text": "Mcd0nald Pvt. Ltd. /n cheeseburger 1 2.00 $";
"Font": "Times new roman";
"Coordinate": [X_tl, Y_tl, X_br, Y_br, h, w];
"Color": [R,G,B];
"Corrected_text": "McDonald Pvt. Ltd. /n cheeseburger 1 2.00 $"
"Contains_handwritten_text": False
"Entities" : "[line item]"
}
```

Referring to the above example representation, in an embodiment, attributes of the logical block "block 1" such as text, font, coordinate, color may be extracted from the OCR module 206 as "Mcd0nald Pvt. Ltd./n cheeseburger 1 2.00 $", "Times new roman", "[$X_{tl}$, $Y_{tl}$, $X_{br}$, $Y_{br}$, h, w]" respectively. $X_{tl}$ and $Y_{tl}$ may be the X and Y axis coordinate of the top-left corner of the block, and likewise $X_{br}$ and $Y_{br}$ may be the X and Y axis coordinate of the bottom-right corner of the block. Further, attributes such as height and width of "block 1" may be extracted as "h" and "w". Further, color (ex: the most prominent colour) present in block 1, that is to say, the corresponding "RGB" value of block 1 may be extracted from the OCR module 206.

In an embodiment, using the tagged data obtained from the tagging module 208, the incorrect text "McD0nald Pvt. Ltd./n cheeseburger 1 2.00 $" may be replaced with the correct word "McDonald Pvt. Ltd./n cheeseburger 1 2.00 $". Further, the handwritten text may be obtained as "false", indicating absence of handwritten text in the corresponding block 1.

In an embodiment, using the tagged data obtained from the tagging module 208, entities corresponding to the logical block 1 may also be extracted. The entity corresponding to the block may be "line item". It is understood that, the entities differ as per the logical blocks.

In an embodiment, a second input may be extracted for the training corpus 310. The second input may be extracted based on the data extracted from the OCR module 206 and the tagging module 208.

In an embodiment, the second input may comprise attributes corresponding to word tokens in the logical blocks, taking one word at a time. As an example, let's say $X_2$ is the second input, where the "word 1" may be extracted from the logical block 1. The input "$X_2$" may be represented as provided below:

```
X₂:
{
"Name" : "word 1";
"Text": "Mcd0nald";
"Font": "Times new roman";
"Coordinate": [X_tl, Y_tl, X_br, Y_br, h, w];
"Color": [R,G,B];
"Corrected_text": "McDonald"
"Contains_handwritten_text": False
"Entities" : "[Merchant name]"
}
```

Referring to the above example representation, in an embodiment, attributes of the "word 1", such as text, font, coordinate, color may be extracted from the OCR module 206 as "Mcdonald", "Times new roman", "[$X_{tl}$, $Y_{tl}$, $X_{br}$, $Y_{br}$, h, w]" respectively. $X_{tl}$, $Y_{tl}$, $X_{br}$, $Y_{br}$, h, w corresponds to the word instead the block, as explained earlier. Further, color of the word, that is to say, the corresponding "RGB" value of the word may be extracted from the OCR module 206.

In an embodiment, using the tagged data obtained from the tagging module 208, the incorrect word "McD0nald" may be replaced with the correct word "McDonald". Further, the handwritten text is obtained as "false", indicating absence of the handwritten text in the corresponding word.

In an embodiment, using the tagged data obtained from the tagging module 208, entities corresponding to the word may also be extracted. As an example, word 1—"McDonald" may be extracted as merchant name, using the tagged data obtained from the tagging module 208. Likewise, the input "$X_2$ is extracted for all the other words present in the document.

In an embodiment, a third input may be extracted for the training corpus 310. The third input may be extracted based on the data extracted from the OCR module 206 and the tagging module 208.

In an embodiment the third input may comprise entire raw_ocr_text of the document. As an example, let's say $X_3$ is the third input that may represent a raw_ocr_text in one of the documents. The input "$X_3$" may be represented as provided below:

```
X₃:
{
"raw_ocr_text" : "entire ocr text";
"Entities": [document type, category, locale, currency,
logo_exist, stamp_exist,
handwritten_exist, type]
}
```

Likewise, raw_ocr_text of the other N number documents may be considered for information extraction for the training corpus 310.

In an embodiment, using the tagged data obtained from the tagging module 208, entities present in the raw_ocr_text of the documents may be extracted. The entities corresponding to the documents may include document type, category of the document, locale present in the document, currency. Further, logo-true may be obtained, if logo is present in the document, stamp-true may be obtained, if stamp is present in the document and, if any handwritten text present in the document then an output "true" may be obtained. Further, if the document belong to one of the types of document, such as whether it is machine-generated pdf/, scanned pdf/image/camera generated image (based on tagging), the type of document may be extracted.

In an embodiment the inputs $X_1$, $X_2$ and $X_3$ corresponding to N documents may be extracted for word embedding training.

In an embodiment, text data from the input $X_1$ may be extracted, that may be text corresponding to text present in the logical block, let's say block 1. As an example, let's say, "$X_1$.text: "Mcdonald Pvt Ltd/n cheeseburger 12.00$" represents the text present in the block 1. Further, data corresponding to "texts/words" present in the block 1, taking one word at a time, may be extracted and represented as "$X_2$.text: "Mcdonald". Likewise, entire raw_ocr_text data from the corresponding document, let' say document 1 may be extracted as, $X_3$.text: "raw_ocr_text".

In an embodiment, the text data extracted from the inputs $X_1$, $X_2$ and $X_3$ may be concatenated, that may be represented as provided below:

$$X_1.\text{text}+<\text{space}>+X_2.\text{text}+<\text{space}>+X_3.\text{text}=\text{word}_i^{text} \quad (1)$$

In an embodiment, training corpus 310 may be constructed by concatenating text as provided in the equation (1) for each word in the document. The training corpus 310 using Document_1 may be represented as:

$$\text{word}_1^{text}+<\text{space}>+\text{word}_2^{text}+<\text{space}>+\text{word}_3^{text}+\ldots+\text{word}_N^{text}$$

In an embodiment, overall training corpus 310 comprising "M" number of documents to be used for training word embedding in the machine learning modules may be represented as:

$$\text{Document}_1+<\text{space}>+\text{Document}_2+\ldots+\text{Document}_M$$

In an embodiment, training the word embedding may include one or more technologies such as, common bag of words (CBOW), hierarchical softmax and negative sampling, among others. The training corpus 310 corresponding to the word embedding may be used to train the document level classification ML module 302, block level classification ML module 304 and the word level classification to derive semantic information from the documents.

In an embodiment, a fourth input may be extracted for the training corpus 310.

In an embodiment, the fourth input may comprise low resolution image of the document. As an example, let's say $X_4$ is the fourth input that may be represented as provided below:

$X_4$:
{
"urltoimage" : "http://lowresolutionat64pixel.s3.bucket.com";
"Entities": [document type, category, locale, currency, logo_exist, stamp_exist,
handwritten text_exist, type]
}

Referring to the above example representation, input $X_4$, may be extracted using the tagging module 208 and the image of the document, in accordance with an embodiment.

In an embodiment, as an example, the lower resolution image may be of 64×64 resolution. Basically, for extracting layout information of the documents, high resolution images of the documents are not required. Therefore, the document level, block level and word level classification ML modules 302, 304 and 306 respectively, are fed with low resolution images of the documents. The low resolution images of the documents can significantly help in reducing computational requirements of processors.

Referring to the above example representation of the input $X_4$, in an embodiment, using the tagged data obtained from the tagging module 208, entities present in the raw-ocr-text of the documents may be extracted. The entities corresponding to the documents may include document type, category of the document, locale present in the document, currency. Further, logo-true may be obtained, if logo is present in the document, stamp-true may be obtained, if stamp is present in the document and, if any handwritten text present in the document then an output "true" may be obtained. Further, if the document belong to any of the type of document, such as whether it is machine-generated pdf/, scanned pdf/image/camera generated image (based on tagging), the type of document may be extracted.

In an embodiment, a fifth input may be extracted for the training corpus 310. The fifth input may be extracted based on the data extracted from the OCR module 206 and the tagging module 208.

In an embodiment, the fifth input may comprise superimposing the logical blocks present in the documents onto their corresponding low resolution images of the documents. That is to say, the fifth input $X_5$ may be extracted by considering the inputs $X_1$ and $X_4$. The $X_5$ may be represented as provided below:

$X_5$:
{
"urltoimage":"http://layout_overlaid_on_image_lowresolutionat64pixel.s3.bucket.com";
"Entities" : "[header - #1234], [address - #1342], [line item - #4123]"
}

Referring to the above example representation, the input $X_5$, may be extracted using the layout preserving OCR module 206 and tagging module 208, in accordance with an embodiment. The attributes corresponding to identified logical blocks in the low resolution image may be extracted using the OCR module 206. The attributes may correspond to text present in the logical blocks, font of the texts, coordinates of the logical blocks, and colour of the logical blocks, among others.

Figure 4B:
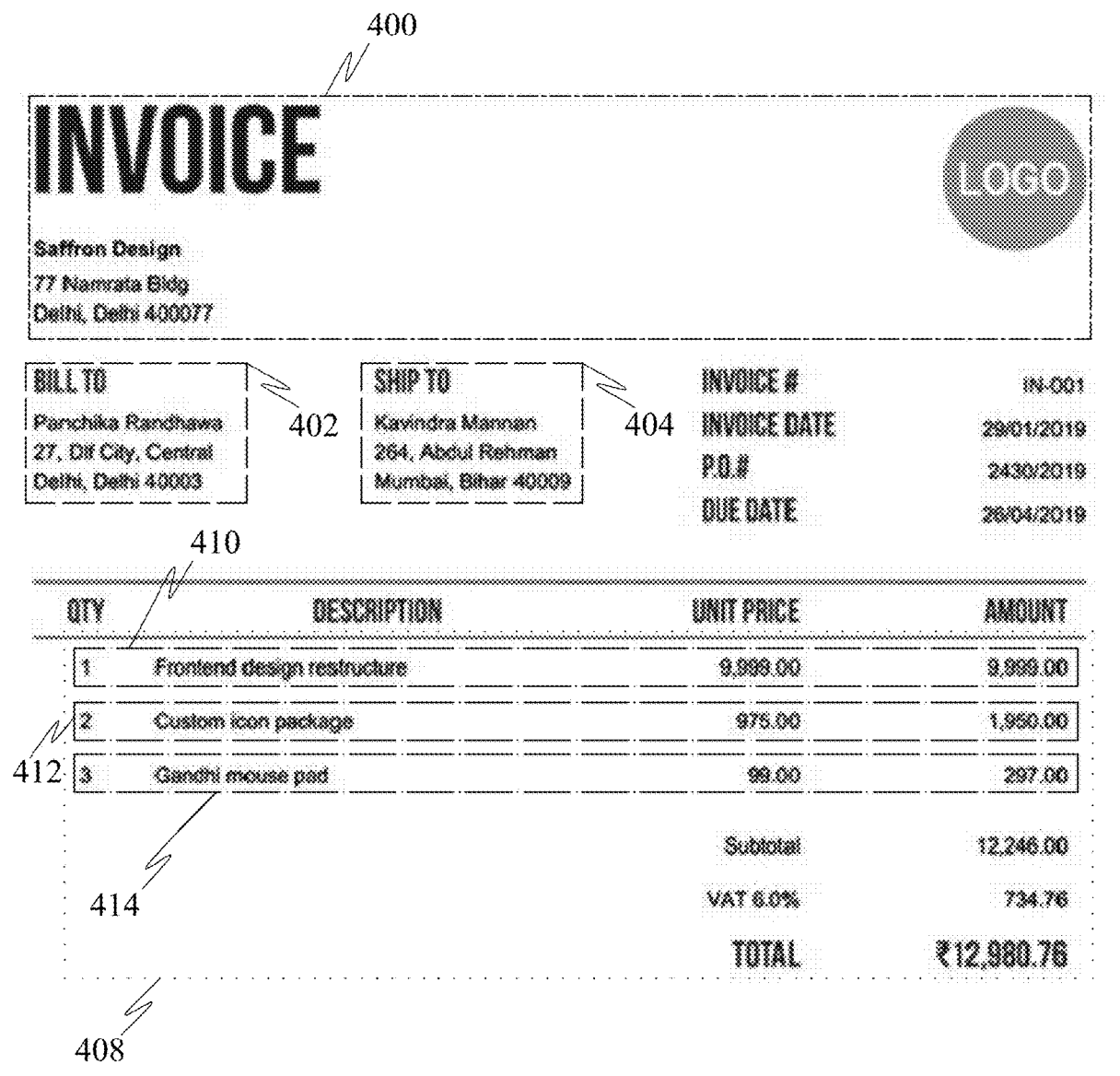

Referring to the above example representation of the input $X_5$, in an embodiment, using the tagged data obtained from the tagging module 208, the entities corresponding to the "block 1", such as "header" 400 with a colour code #1234, "address" 402, 404 with a colour code #1342, body 408 with a colour code # 2134, and line items 410, 412, 414 with a colour code #4123, among others may be extracted. Refer to FIG. 4B, illustrating colour coded blocks 450, 452, 454, 456, 458, with colour codes #1234, In an embodiment, the training corpus 310 may be utilised to train machine learning modules or ML modules. The ML module in general, may comprise one or more network layers, where the first and the last layers in the network may be called as input and output layers, respectively, and all the layers in between may be called as hidden layers. The machine learning modules may include word embedding layers, a convolution and pooling layers, categorial embedding layers (embedding layers) and, fully connected layers, among others.

In an embodiment, input data corresponding to images may be received by the convolution and pooling layers. The convolutional and pooling layers are configured to learn and analyse visual imagery in the images.

In an embodiment, input data corresponding to texts/words may be received by the word embedding layers. The word embedding layers may be configured to learn and analyse word embeddings and representations.

In an embodiment, input data corresponding to colour may be received by the embedding layer. The embedding layers may be configured to learn and analyse vector representations of discrete variables.

In an embodiment, input data corresponding to height, width, and coordinates, among others may be fed to the fully connected layer. The fully connected layer may be configured to learn and analyse numerical variables.

In an embodiment, the document level classification ML module 302 may correspond to training the module to output entities information corresponding to the documents. That is to say, document type, document category and type, among others.

Figure 5:
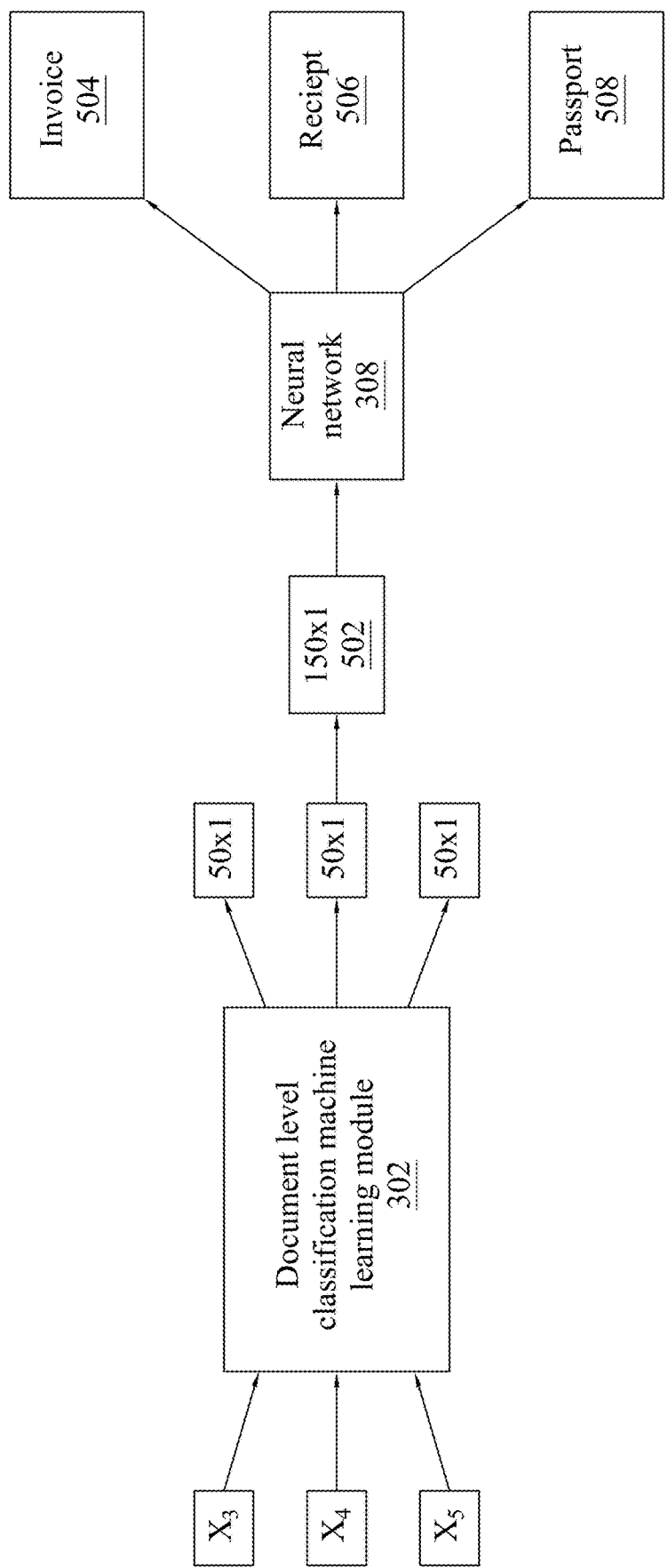
FIG. 5 illustrates a document level classification machine learning module 302, in accordance with an embodiment.

In an embodiment, the document level classification ML module 302 may be trained by feeding specific heterogeneous inputs, that may be obtained from the training corpus 310. The heterogenous inputs to train the document level classification ML module 302 may comprise $X_3$, $X_4$ and $X_5$ FIG. 5 illustrates, feeding the document level classification ML module 302 with the inputs $X_3$, $X_4$ and $X_5$. The input $X_3$ may be received by the word embedding layer of the document level classification ML module 302. The inputs $X_4$ and $X_5$ may be received by the convolution and pooling layer of the document level classification ML module 302. Further, each of the inputs $X_3$, $X_4$ and $X_5$ may be represented in a vector space with "50×1" vector size.

In an embodiment, the inputs $X_3$, $X_4$ and $X_5$ may be concatenated at the document level classification ML module 302. The concatenated output 502 may be represented in the vector space with "150×1" vector size. The concatenated output 502 may be fed to a fully connected neural network 308. Refer to FIG. 5, the fully connected neural network 308 may output documents, that are classified into one or more types, such as invoice 504, receipt 506, and passport 508, among others.

Figure 6:
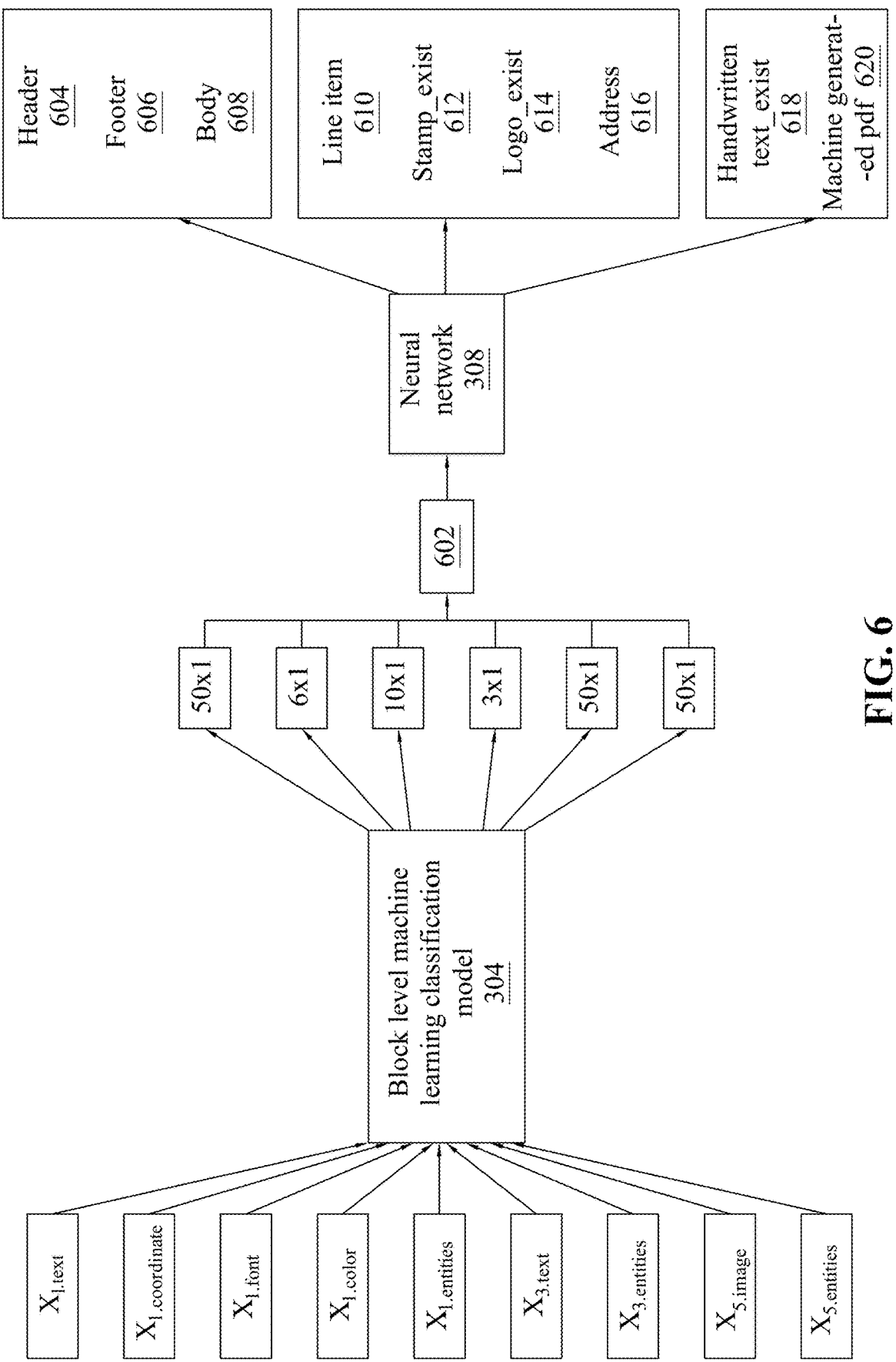
FIG. 6 illustrates a block level classification machine learning module 304, in accordance with an embodiment.

In an embodiment, the block level classification ML module 304 may be trained by feeding specific heterogeneous inputs, that may be obtained from the training corpus 310. The heterogeneous inputs to train the block level classification ML module 304, may comprise $X_1$, $X_3$ and $X_5$ (along with the tagged entities). FIG. 6 illustrates, feeding the block level classification ML module 304 with the inputs $X_1$, $X_3$, and $X_5$. The extracted attributes corresponding to the input $X_1$ may be represented as "$X_1$.text", corresponding to the text present in the logical blocks, as an example, block 1, wherein "$X_1$.coorodinate", corresponds to coordinates of the block 1, "$X_1$.font", corresponds to font of the text present in the block 1 and, "$X_1$.colour", corresponds to the colour of the block 1.

In an embodiment, the attribute "$X_1$.text" of the input $X_1$ may be received by the word embedding layer of the block level classification ML module 304. The input "$X_1$.text" may be represented in a vector space with "50×1" vector size.

In an embodiment, the attribute "$X_1$.coordinate" of the input $X_1$ may be received by the fully connected layer of the block level classification ML module 304. The input "$X_1$.coordinate" may be represented in a vector space with "6×1" vector size.

In an embodiment, the attribute "$X_1$.font" of the input $X_1$ may be received by the fully connected layer of the block level classification ML module 304. The input "$X_1$.font" may be represented in a vector space with "10×1" vector size.

In an embodiment, the attribute "$X_1$.colour" of the input $X_1$ may be received by the embedding layer of the block level classification ML module 304. The input "$X_1$.font" may be represented in a vector space with "3×1" vector size.

In an embodiment, the extracted attributes corresponding to the input $X_3$ may be represented as "$X_3$.text", corresponding to the raw_ocr_text present in the images of the documents. The input "$X_3$.text" may be received by the word embedding layer of the block level classification ML module 304. The input "$X_3$.text" may be represented in a vector space with "50×1" vector size.

In an embodiment, the extracted attributes corresponding to the input $X_5$ may be represented as "$X_5$.image". The "$X_5$.image" may correspond to superimposed images of the documents, comprising the logical blocks superimposed onto their corresponding low resolution images. The input "$X_5$.image" may be received by the convolution and pooling layer of the block level classification ML module 304. The input "$X_5$.image" may be represented in a vector space with "50×1" vector size.

In an embodiment, the inputs $X_1$, $X_3$ and $X_5$ may be concatenated at the block level classification ML module 304. The concatenated output may be represented in the vector space with "150×1" vector size. The concatenated output 602 may be fed to a fully connected neural network 308. Refer to FIG. 6, the fully connected neural network 308 may output entities, such as header 604, footer 604, body 608, line item 610, stamp_exist 612, logo_exist 614, address 616, handwritten text_exist 618 and machine generated pdf 620, among others. The entities header 604, footer 604 and body 608 may be classified into one category. The entities line item 610, stamp 612, logo 614 and address 616 may be classified into different category. Further, handwritten text_exist 618 and machine generated pdf 620 are classified separately.

Figure 7:
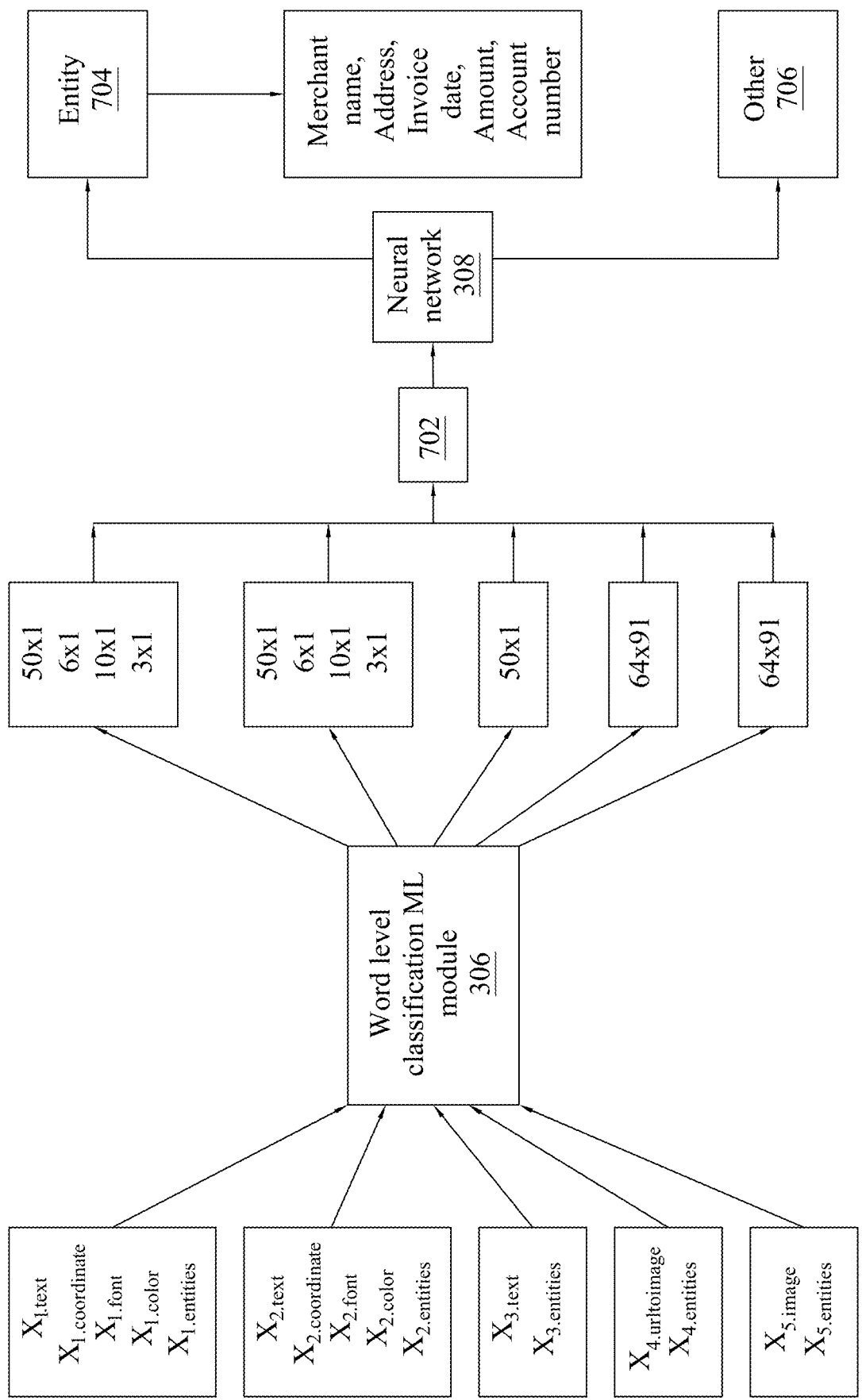
FIG. 7 illustrates a word level classification machine learning module 306, in accordance with an embodiment.

In an embodiment, word level classification ML module 306 may be trained by feeding specific heterogeneous inputs, that may be obtained from the training corpus 310. The heterogeneous inputs to train the word level classification ML module 306, may comprise $X_1$, $X_2$, $X_3$, $X_4$ and $X_5$ (along with the tagged entities). FIG. 7 illustrates, feeding the block level classification ML module 306 with the inputs $X_1$, $X_2$, $X_3$, $X_4$ and $X_5$. The extracted attributes corresponding to the input $X_1$ may be represented as "$X_1$.text", corresponding to the text present in the logical blocks (as an example, block 1), "$X_1$.coorodinate", corresponding to coordinates of the block 1, "$X_1$.font", corresponding to font of the text present in the block 1 and, "$X_1$.colour", corresponding to the colour of the block 1.

In an embodiment, the input "$X_1$.text" may be received by the word embedding layer of the word level classification ML module 306. The input "$X_1$.text" may be represented in a vector space with "50×1" vector size. The inputs $X_1$.font and $X_1$.coorodinate may be received by the fully connected layer. The input "$X_1$.font" may be represented in a vector space with "10×1" vector size and the input "$X_1$.coordinate" may be represented in a vector space with "6×1" vector size. The input $X_1$.colour may be received by the embedding layer of the word level classification module 306 and may be represented in a vector space with "3×1" vector size.

In an embodiment, the extracted attributes corresponding to the input $X_2$ may be represented as "$X_2$.text", corresponding to the text/word (as an example, word 1 of the block 1), "$X_2$.coorodinate", corresponding to coordinates of the word 1, "$X_2$.font", corresponding to font of the text present in the word 1 and, "$X_2$.colour", corresponding to the colour of the word 1.

In an embodiment, the input "$X_2$.text" may be received by the word embedding layer of the word level classification module 306. The input "$X_2$.text" may be represented in a vector space with "50×1" vector size The inputs $X_2$.font, $X_2$.coorodinate may be received by the fully connected layer. The input "$X_2$.font" may be represented in a vector space with "10×1" vector size and the input "$X_2$.coordinate" may be represented in a vector space with "6×1" vector size. The input $X_2$.colour may be received by the embedding layer of the word level classification module 306 and may be represented in a vector space with "3×1" vector size.

In an embodiment, the extracted attributes corresponding to the input $X_3$ may be represented as "$X_3$.text", corresponding to the raw_ocr_text of the documents. The input "$X_3$.text" may be received by the word embedding layer of the word classification module 306 and may be represented in a vector space with "50×1" vector size.

In an embodiment, the extracted attributes corresponding to the inputs $X_4$ and $X_5$ may be represented as "$X_4$.urltoimage" and "$X_5$.image", where the "$X_4$.urltoimage" may correspond to low resolution images of the documents and "$X_5$.image" may correspond to superimposed images of the documents, comprising the logical blocks superimposed onto their corresponding low resolution images. The inputs "$X_4$.urltoimage" and "$X_5$ image" may be received by the convolution and pooling layer of the word classification ML module 306. The inputs $X_4$.urltoimage" and "$X_5$.image" may be represented in a vector space with "64×91" and "64×91" vector size respectively.

In an embodiment, the inputs $X_1$, $X_2$, $X_3$, $X_4$ and $X_5$ may be concatenated at the word level classification ML module 306. The concatenated output 702 may be represented in the vector space with "150×1" vector size. The concatenated output 702 may be fed to a fully connected neural network 308. Refer to FIG. 7, the fully connected neural network 308 may output entities 704, such as merchant name, address, invoice date, amount, tax amount and account number, among others. The entities may be classified as other 706, other than the entities 704.

Figure 8:
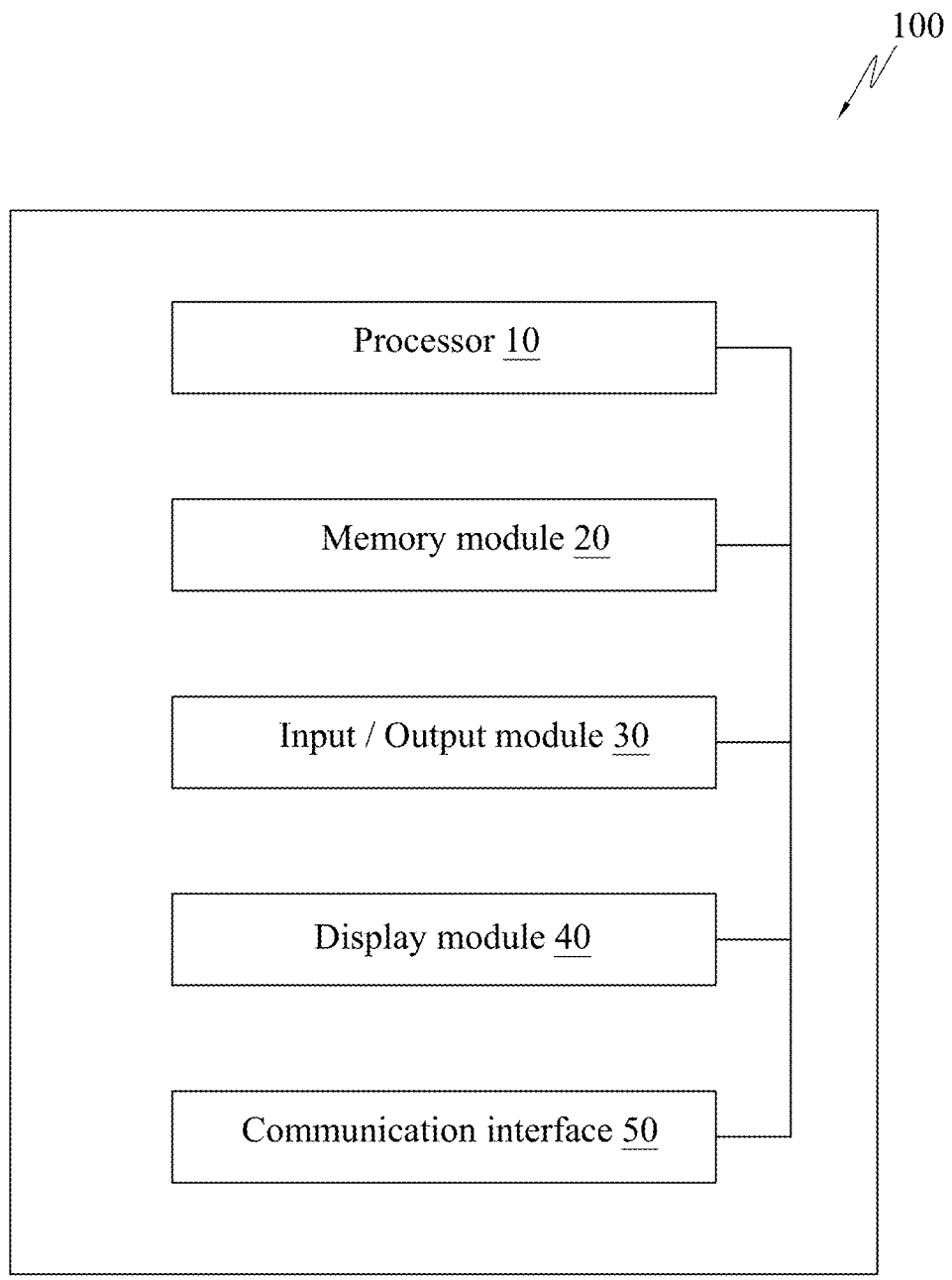
FIG. 8 illustrate a hardware configuration of the computing device 104, in accordance with an embodiment.

FIG. 8 illustrates a hardware configuration of the computing device 104, in accordance with an embodiment.

In an embodiment, the computing device 104 may include one or more processors 10. The processor 10 may be implemented as appropriate in hardware, computer-executable instructions, firmware, or combinations thereof. Computer-executable instruction or firmware implementations of the processor 10 may include computer-executable or machine-executable instructions written in any suitable programming language to perform the various functions described. Further, the processor 10 may execute instructions, provided by the various modules of the computing device 104.

In an embodiment, the computing device 104 may include a memory module 20. The memory module 20 may store additional data and program instructions that are loadable and executable on the processor 10, as well as data generated during the execution of these programs. Further, the memory module 20 may be volatile memory, such as random-access memory and/or a disk drive, or non-volatile memory. The memory module 20 may be removable memory such as a Compact Flash card, Memory Stick, Smart Media, Multimedia Card, Secure Digital memory, or any other memory storage that exists currently or will exist in the future.

In an embodiment, the computing device 104 may include an input/output module 30. The input/output module 30 may provide an interface for inputting devices such as keypad, touch screen, mouse, and stylus among other input devices; and output devices such as speakers, printer, and additional displays among other.

In an embodiment, the computing device 104 may include a display module 40 may be configured to display content. The display module 40 may also be used to receive an input from a user. The display module 40 may be of any display type known in the art, for example, Liquid Crystal Displays (LCD), Light emitting diode displays (LED), Orthogonal Liquid Crystal Displays (OLCD) or any other type of display currently existing or may exist in the future.

In an embodiment, the computing device 104 may include a communication interface 50. The communication interface 50 may provide an interface between the computing device 104, server 106 and external networks. The communication interface 50 may include a modem, a network interface card (such as Ethernet card), a communication port, or a Personal Computer Memory Card International Association (PCMCIA) slot, among others. The communication interface 50 may include devices supporting both wired and wireless protocols.

In an embodiment, the server 106 may include processors, memory module, the input/output module and communication interface. The processors of the server 106 may execute various instructions of the modules provided in the server 106.

The processes described above is described as a sequence of steps, this was done solely for the sake of illustration. Accordingly, it is contemplated that some steps may be added, some steps may be omitted, the order of the steps may be re-arranged, or some steps may be performed simultaneously.

The example embodiments described herein may be implemented in an operating environment comprising software installed on a computer, in hardware, or in a combination of software and hardware.

Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

Many alterations and modifications of the present invention will no doubt become apparent to a person of ordinary skill in the art after having read the foregoing description. It is to be understood that the phraseology or terminology employed herein is for the purpose of description and not of limitation. It is to be understood that the description above contains many specifications, these should not be construed as limiting the scope of the invention but as merely providing illustrations of some of the personally preferred embodiments of this invention.

What is claimed is:

1. A method of training a system to extract information from documents, the method comprising:
   feeding training documents in digital form to a layout preserving Optical Character Recognition (OCR) module;
   identifying, by the OCR module, within each of documents, multiple logical blocks in the document;
   identifying, by the OCR module, text present in each of the identified blocks;
   receiving, by a tagging module, one or more tags for the whole of the document, one or more tags for one or more of the logical blocks and one or more tags for one or more word tokens on the document;
   receiving, by a machine learning module, a text input comprising the text identified in the document and the tags for the whole of the document; and
   receiving, by the machine learning module, a first image of the document with layout of the one or more of the identified blocks superimposed and the tags for the logical blocks in the document, wherein the machine learning module receives the text input and the first image and the tags for the logical blocks corresponding to a plurality of the training documents.

2. The method of claim 1, wherein the machine learning module learns to classify documents into type of document based on the text input and the first image and the tags for the logical blocks corresponding to the plurality of the training documents.

3. The method of claim 2, further comprising, receiving, by the machine learning module, a second image of the document to classify the document into the type, wherein the second image is of lower resolution as compared to the resolution of the document provided to the OCR module, wherein the second image of the document is free from superimposition of the layout of the identified blocks.

4. The method of claim 3, wherein, the first image is a colour coded image, wherein the identified blocks are colour coded based on the tags associated with the blocks and the coloured blocks are superimposed on the image of the training document to obtain the first image of the training document.

5. The method of claim 1, further comprising training the machine learning module to classify logical blocks in documents, wherein training the machine learning module to classify the logical blocks in the documents comprises receiving for each of at least some of the training documents:
   text present in the identified logical blocks;
   coordinates of the identified logical blocks;
   predominant font type of the text in each of the identified logical blocks;
   predominant colour of each of the identified logical blocks;
   the first image of the document;
   the tags for the logical blocks; and
   the tags for the whole of the training document.

6. The method of claim 1, further comprising training the machine learning module to classify word tokens in documents, wherein training the machine learning module to classify the word tokens in the documents comprises receiving for each word of in the training documents:
   text present in the block, which comprises the word;
   text of the word;
   the text identified in the document, which comprises the word;
   coordinates of the block, which comprises the word;
   coordinates of the word;
   predominant font type of the text in the block, which comprises the word;
   predominant font type of the text in the word;
   predominant colour of the block, which comprises the word;
   predominant colour of the word;
   the first image of the document;
   the one or more tags for the block, which comprises the word;
   the one or more tags for the word; and
   the tags for the whole of the training document, which comprises the word.

7. The method of claim 1, wherein receiving the tags comprises receiving the tags from a user interface, wherein the tags are provided by a human annotator.

8. The method of claim 7, wherein receiving the tags comprises:
   receiving the tags from the user interface at a document level, wherein the whole of the training document is tagged;
   receiving the tags from the user interface at a block level, wherein one or more of the blocks in each of the training document is tagged; and
   receiving the tags from the user interface at a word level, wherein one or more of the word tokens in each of the training document is tagged.

9. The method as claimed in claim 1, further comprising training the machine learning module with word embedding to derive semantic information from the documents, wherein training the machine learning module with word embedding to derive semantic information from the documents comprises preparing a training corpus,
   wherein, the training corpus for "M" number of documents is:

$$\text{Document}_1 + <\text{space}> + \text{Document}_2 + \ldots + \text{Document}_M$$

wherein, Document1 comprising "N" words is:

$$\text{word}_1^{text} + <\text{space}> + \text{word}_2^{text} + \ldots + \text{word}_N^{text}$$

wherein, $\text{word}_1^{text}$ is:

$$X_1.\text{text} + <\text{space}> + X_2.\text{text} + <\text{space}> + X_3.\text{text} = \text{word}_1^{text}$$

wherein, $X_1$.text is text of the logical block in which a first word is present, $X_2$.text is the text of the first word and $X_3$.text is entire text of the document in which the first word is present.

* * * * *